(12) United States Patent
Huang et al.

(10) Patent No.: US 12,541,269 B2
(45) Date of Patent: Feb. 3, 2026

(54) DRIVER CIRCUIT

(71) Applicant: Novatek Microelectronics Corp., Hsinchu (TW)

(72) Inventors: Chun-Ching Huang, Hsinchu County (TW); Chun-Hung Chen, Taipei (TW); Yu-Chung Lin, Taoyuan (TW)

(73) Assignee: Novatek Microelectronics Corp., Hsinchu (TW)

( * ) Notice: Subject to any disclaimer, the term of this patent is extended or adjusted under 35 U.S.C. 154(b) by 0 days.

(21) Appl. No.: 18/652,788

(22) Filed: May 1, 2024

(65) Prior Publication Data

US 2025/0156010 A1    May 15, 2025

Related U.S. Application Data

(60) Provisional application No. 63/597,702, filed on Nov. 10, 2023.

(30) Foreign Application Priority Data

Feb. 17, 2024 (TW) .................. 113105600

(51) Int. Cl.
  *G06F 3/041* (2006.01)
  *G06F 3/044* (2006.01)
  *G09G 3/20* (2006.01)
(52) U.S. Cl.
  CPC ........ *G06F 3/04184* (2019.05); *G06F 3/0412* (2013.01); *G06F 3/044* (2013.01);
  (Continued)

(58) Field of Classification Search
  CPC .... G06F 3/04184; G06F 3/0412; G06F 3/044; G06F 2203/04107; G09G 3/2092; G09G 2354/00
  See application file for complete search history.

(56) References Cited

U.S. PATENT DOCUMENTS

| | | | |
|---|---|---|---|
| 8,941,602 B2 | 1/2015 | Kim et al. | |
| 11,379,079 B2 * | 7/2022 | Jiang | .................... G06F 3/04184 |

(Continued)

FOREIGN PATENT DOCUMENTS

| | | |
|---|---|---|
| CN | 102402331 | 4/2012 |
| KR | 101862398 | 7/2018 |

(Continued)

OTHER PUBLICATIONS

"Office Action of U.S. Related Application, U.S. Appl. No. 18/652,798", issued on Mar. 24, 2025, p. 1-p. 7.

(Continued)

*Primary Examiner* — Peter D Mcloone
(74) *Attorney, Agent, or Firm* — JCIPRNET

(57) ABSTRACT

A driver circuit, configured to drive a touch display panel, is provided. The touch display panel includes a sensor. The driver circuit includes a timing control circuit and a touch sensing circuit. The timing control circuit is configured to output a touch driving signal to the sensor. The sensor generates a sensing signal according to the touch driving signal. The touch sensing circuit is coupled to the timing control circuit and is configured to receive the sensing signal. The timing control circuit determines a timing of the touch driving signal according to a noise duration signal to drive the sensor to generate the sensing signal.

24 Claims, 16 Drawing Sheets

(52) U.S. Cl.
CPC .  *G09G 3/2092* (2013.01); *G06F 2203/04107* (2013.01); *G09G 2354/00* (2013.01)

(56) References Cited

U.S. PATENT DOCUMENTS

| | | |
|---|---|---|
| 11,693,515 B2 | 7/2023 | Lin et al. |
| 2012/0056834 A1 | 3/2012 | Kim et al. |
| 2014/0160067 A1 | 6/2014 | Kim et al. |
| 2014/0168161 A1 | 6/2014 | Sugita et al. |
| 2014/0292711 A1 | 10/2014 | Teranishi et al. |
| 2015/0378509 A1 | 12/2015 | Choi et al. |
| 2017/0336892 A1 | 11/2017 | Chang |
| 2018/0181241 A1 | 6/2018 | Jung et al. |
| 2018/0299981 A1 | 10/2018 | Lin et al. |
| 2021/0365172 A1* | 11/2021 | Jiang ............ G06F 3/04184 |
| 2022/0187941 A1 | 6/2022 | Park et al. |
| 2024/0160317 A1 | 5/2024 | Jang et al. |

FOREIGN PATENT DOCUMENTS

| | | |
|---|---|---|
| TW | 201003486 | 1/2010 |
| TW | 201901384 | 1/2019 |
| TW | 202329084 | 7/2023 |

OTHER PUBLICATIONS

"Office Action of Taiwan Counterpart Application", issued on Jul. 31, 2025, p. 1-p. 5.
"Office Action of Taiwan Related Application, Application No. 113105599", issued on May 28, 2025, p. 1-p. 7.

\* cited by examiner

DRIVER CIRCUIT

CROSS-REFERENCE TO RELATED APPLICATION

This application claims the priority benefit of U.S. provisional application Ser. No. 63/597,702, filed on Nov. 10, 2023, and Taiwan application serial no. 113105600, filed on Feb. 17, 2024. The entirety of each of the above-mentioned patent applications is hereby incorporated by reference herein and made a part of this specification.

BACKGROUND

Technical Field

The disclosure relates to an electronic circuit, and in particular to a driver circuit for driving a touch display panel.

Description of Related Art

The touch display device is an electronic device that integrates a touch function and a display function, allowing a user to directly operate a display interface by touch when viewing the electronic device, thereby providing a good user experience. However, due to the trend of thinning of the electronic device, the coupling capacitance between a touch device and a display device becomes larger, and the mutual interference becomes more and more serious. As a result, display data for driving a display panel and sensing data generated by a touch panel may be affected. In addition, a noise signal may also affect the accuracy of the sensing data.

SUMMARY

The disclosure provides a driver circuit whose driving manner can at least solve the issue of interference affecting display data or sensing data.

A driver circuit of an embodiment of the disclosure is configured to drive a touch display panel. The touch display panel includes a sensor. The driver circuit includes a timing control circuit and a touch sensing circuit. The touch sensing circuit is configured to output a touch driving signal to the sensor. The sensor generates a sensing signal according to a touch driving signal. The touch sensing circuit is coupled to the timing control circuit and is configured to receive the sensing signal. The timing control circuit determines a timing of the touch driving signal according to a noise duration signal to drive the sensor to generate the sensing signal.

In order for the features and advantages of the disclosure to be more comprehensible, the following specific embodiments are described in detail in conjunction with the drawings.

DESCRIPTION OF THE EMBODIMENTS

Embodiments are provided below to illustrate the disclosure in detail, but the disclosure is not limited to the provided embodiments, and the provided embodiments may be appropriately combined. The term "coupling/coupled" or "connecting/connected" used in the specification (including the claims) of the disclosure may refer to any direct or indirect connection manner. For example, "a first device is coupled to a second device" should be interpreted as "the first device is directly connected to the second device" or "the first device is indirectly connected to the second device through other devices or connection means". In addition, the term "signal" may refer to current, voltage, charge, temperature, data, electromagnetic waves, or any one or more signals.

Figure 1:
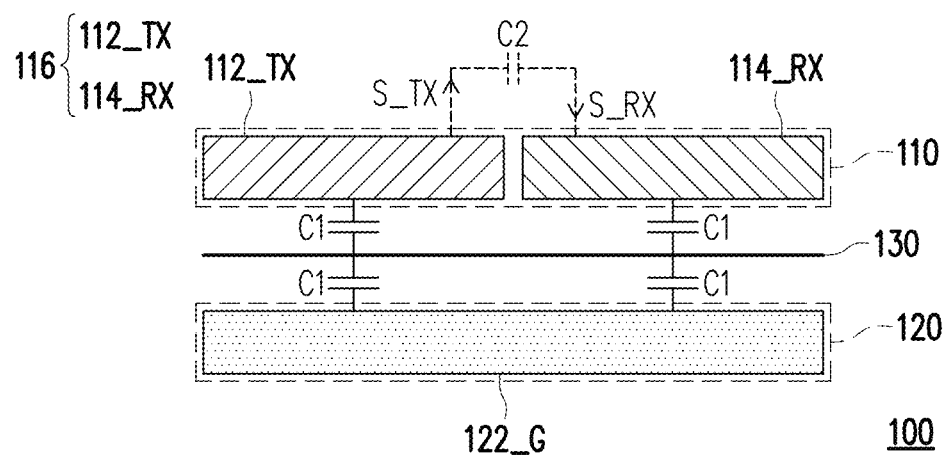
FIG. 1 is a schematic diagram of a stacked structure of a touch display panel according to an embodiment of the disclosure.
Figure 2:
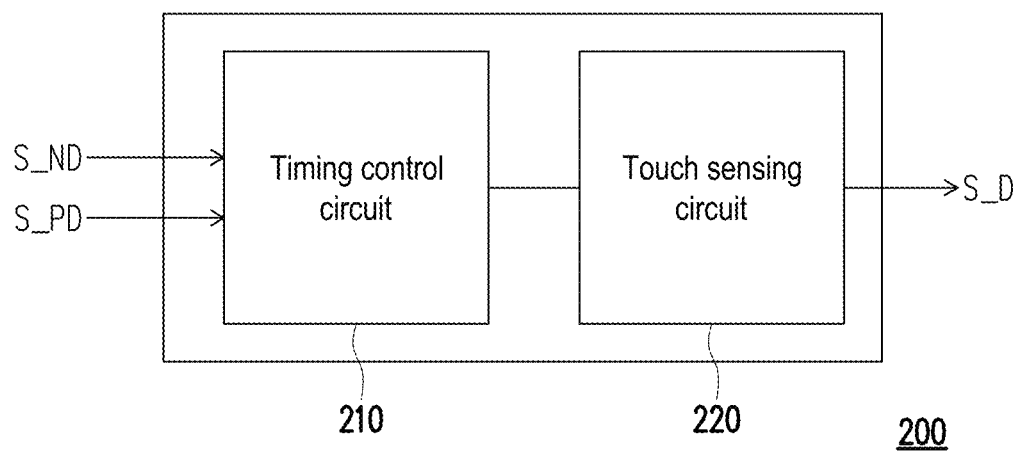
FIG. 2 is a schematic block diagram of a driver circuit according to an embodiment of the disclosure.

FIG. 1 is a schematic diagram of a stacked structure of a touch display panel according to an embodiment of the disclosure. FIG. 2 is a schematic block diagram of a driver circuit according to an embodiment of the disclosure. Please refer to FIG. 1 and FIG. 2. A touch display panel 100 includes a touch circuit 110, a display circuit 120, and a shielding layer 130.

The touch circuit 110 includes a driving electrode 112_TX and a sensing electrode 114_RX. The driving electrode 112_TX and the sensing electrode 114_RX serve as a sensor 116 (for example, a mutual capacitance touch screen) and are configured to sense a capacitance change, that is, a capacitance to be measured C2, generated by an object touching the touch display panel 100, but the disclosure is not limited thereto. In another embodiment, such as a self-capacitive touch screen, the sensor 116 may not be divided into the driving electrode and the sensing electrode, and only includes sensing electrodes. The display circuit 120 includes a gate line 122_G. The shielding layer 130 is included in the middle of the touch circuit 110 and the display circuit 120. The shielding layer 130 is, for example, connected to a cathode of an organic light emitting diode and is configured to transmit a reference voltage ELVSS. Due to the trend of panel thinning, a parasitic capacitance C1 becomes larger, so the degree of voltage coupling interference also becomes larger.

For example, common interference occurs at the moment of signal transition of a touch driving signal, and another common interference occurs during the period when display data is updated, such as the moment of signal transition on the gate line 122_G. A driver circuit 200 of the embodiment of the disclosure is configured to drive the touch display panel 100, and a driving method thereof can solve the issue of interference affecting sensing data or display data.

Specifically, when image data is to be updated, a timing control circuit 210 first outputs a horizontal synchronization signal. Due to signal coupling, a surge (which may be regarded as a noise signal) may be easily generated on a reference voltage. At this time, if a touch driving signal S_TX is triggered to transmit data, signals output by an analog front end circuit will be saturated, thereby causing a demodulator circuit to output an inaccurate demodulation signal.

In view of this, in order to at least to solve such an issue, the driver circuit 200 of the embodiment of the disclosure may determine the timing of the touch driving signal S_TX according to a noise duration signal S_ND to prevent transmitting a signal at a time point when the surge is generated on the reference voltage, thereby preventing the touch driving signal S_TX from being affected by the noise signal on the reference voltage to further reduce the interference on the sensing signal by the noise signal.

On the other hand, touch interference on display may also occur during the period when the display data is updated, that is, when a gate signal is turned on. Due to coupling interference, the instantaneous transition of the touch driving signal S_TX may easily cause a data signal to jitter. If the data signal is not stabilized before the end of the update time, that is, before the gate signal is turned off, display color deviation may easily occur.

In view of this, in order to at least to solve such an issue, the timing control circuit 210 of the embodiment of the disclosure may determine the timing and the slew rate of the touch driving signal S_TX according to a prohibit duration signal S_PD to reduce interference on the data signal by the touch driving signal when the gate signal transitions.

Specifically, the driver circuit 200 includes the timing control circuit 210 and a touch sensing circuit 220. The touch sensing circuit 220 is coupled to the timing control circuit 210. The timing control circuit 210 outputs the touch driving signal S_TX to the sensor 116 (for example, the driving electrode 112_TX). Then, the sensor 116 (for example, the sensing electrode 114_RX) generates a sensing signal S_RX according to the touch driving signal S_TX to be transmitted to the touch sensing circuit 220. The touch sensing circuit 220 receives the sensing signal S_RX and performs operations such as demodulation and filtering on the sensing signal S_RX, thereby generating sensing data S_D.

In an embodiment of the disclosure, the timing control circuit 210 may receive the noise duration signal S_ND or the prohibit duration signal S_PD, and determine the timing of the touch driving signal S_TX according to the noise duration signal S_ND or the prohibit duration signal S_PD to drive the sensor 116 to generate the sensing signal S_RX. In an embodiment, the timing control circuit 210 may also determine the slew rate of the touch driving signal S_TX according to the prohibit duration signal S_PD. Therefore, through the driving method of the embodiment of the disclosure, the driver circuit 200 can solve the issue of interference affecting the sensing data or the display data.

First, it is explained that the timing control circuit may determine the timing of the touch driving signal according to the noise duration signal to drive the sensor to generate the sensing signal.

Figure 3:
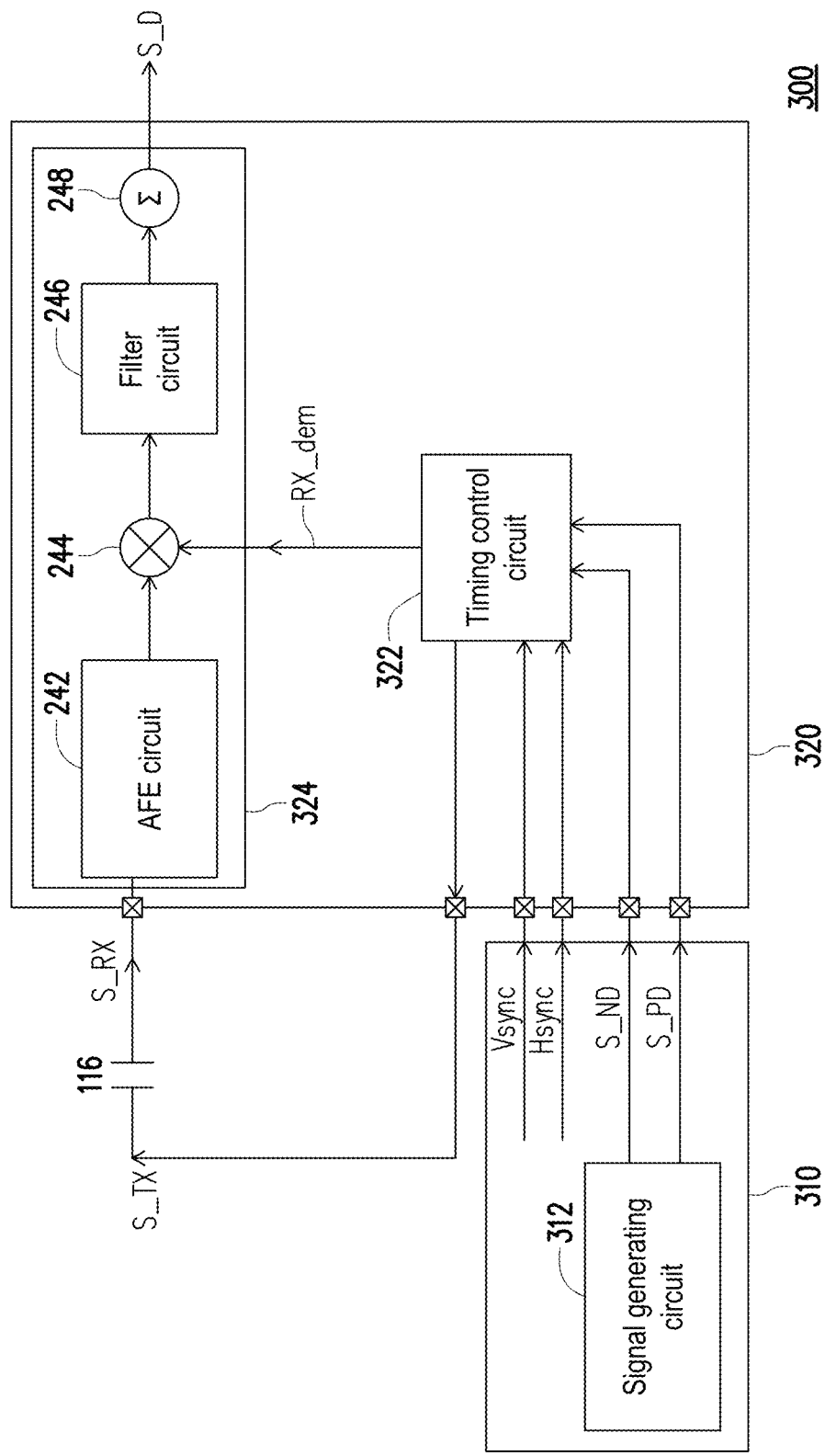
FIG. 3 is a schematic block diagram of a driver circuit according to another embodiment of the disclosure.
Figure 4:
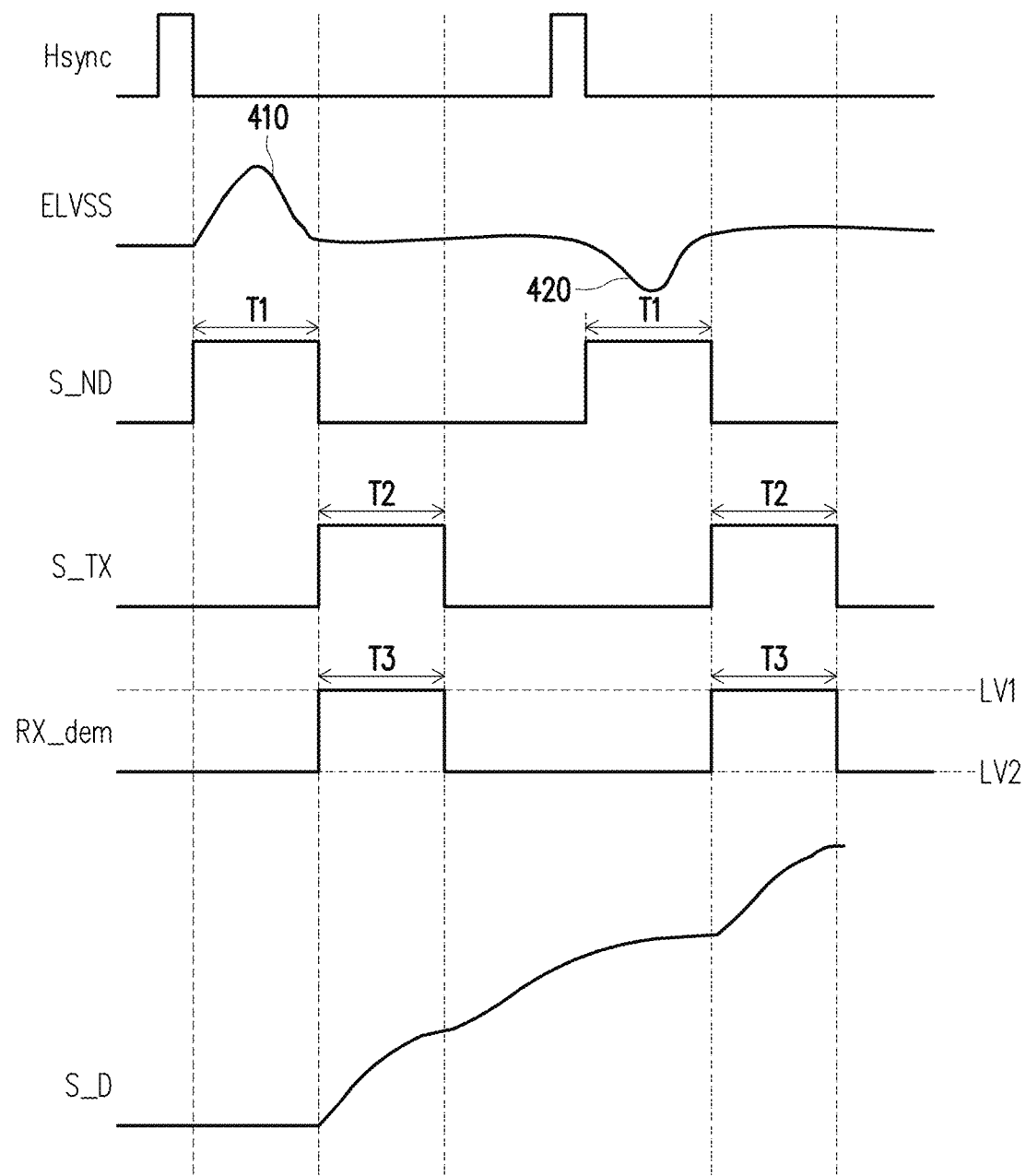
FIG. 4 is a schematic diagram of a waveform of each signal in the driver circuit of FIG. 3.

FIG. 3 is a schematic block diagram of a driver circuit according to another embodiment of the disclosure. FIG. 4 is a schematic diagram of a waveform of each signal in the driver circuit of FIG. 3. Please refer to FIG. 3 and FIG. 4. A driver circuit 300 includes a display driver circuit 310 and a touch driver circuit 320. The display driver circuit 310 is coupled to the touch driver circuit 320. The display driver circuit 310 is configured to output the noise duration signal S_ND, the prohibit duration signal S_PD, a horizontal synchronization signal Hsync, and a vertical synchronization signal Vsync to the touch driver circuit 320.

Specifically, the display driver circuit 310 is configured to drive the touch display panel 100 to display an image screen. The display driver circuit 310 is coupled to a timing control circuit 322. The display driver circuit 310 is configured to output the noise duration signal S_ND and the prohibit duration signal S_PD to the timing control circuit 322. The display driver circuit 310 includes a signal generating circuit 312. The signal generating circuit 312 is configured to generate the noise duration signal S_ND and the prohibit duration signal S_PD to the touch driver circuit 320. In addition, sufficient teachings, suggestions, and implementation explanations on the hardware structure of the signal generating circuit 312 may be obtained by referring to common knowledge in the art.

The noise duration signal S_ND is configured to indicate that the reference voltage ELVSS is interfered by noise signals 410 and 420 during a noise interference duration T1. The reference voltage ELVSS is, for example, a reference voltage for driving a display pixel of the touch display panel 100. For example, the display pixel of the touch display panel 100 includes an organic light emitting diode, and the reference voltage ELVSS may be applied to a cathode of the organic light emitting diode to serve as an operating voltage of the display pixel. The noise signals 410 and 420 are noise interfering with the reference voltage ELVSS.

The horizontal synchronization signal Hsync is configured to indicate a scanning duration of any pixel row of the touch display panel 100. For example, one of the pixel rows of the touch display panel 100 is scanned during a time duration between two square waves of the horizontal synchronization signal Hsync.

On the other hand, the touch driver circuit 320 includes the timing control circuit 322 and a touch sensing circuit 324. The timing control circuit 322 is configured to output the touch driving signal S_TX to the sensor 116. The sensor 116 generates the sensing signal S_RX according to the touch driving signal S_TX. The touch sensing circuit 324 is coupled to the timing control circuit 322. The touch sensing circuit 324 is configured to receive the sensing signal S_RX and receive a demodulation signal RX_dem from the timing control circuit 322 to perform a demodulation operation on the sensing signal S_RX, thereby generating the sensing data S_D.

The touch sensing circuit 324 includes an analog front end (AFE) circuit 242, a demodulator circuit 244, a filter circuit 246, and an accumulator circuit 248. The AFE circuit 242 receives the sensing signal S_RX. The AFE circuit 242 performs operations such as signal capture, analog filtering, analog-to-digital conversion (ADC), or power amplification on the sensing signal S_RX. The demodulator circuit 244 performs the demodulation operation on the sensing signal S_RX using the demodulation signal RX_dem. Next, the filter circuit 246 performs a filtering operation on the demodulated sensing signal S_RX. The accumulator circuit 248 may accumulate the filtered sensing signal S_RX to generate the sensing data S_D.

In the embodiment, the timing control circuit 322 determines the timing of the touch driving signal S_TX according to the noise duration signal S_ND to drive the sensor 116 to generate the sensing signal S_RX. The touch driving signal S_TX drivers the sensor 116 to generate the sensing signal S_RX during an enable period T2. In other words, according to the indication of the noise duration signal S_ND, the timing control circuit 322 may know that the reference voltage ELVSS is interfered by the noise signals 410 and 420 during the noise interference duration T1. Therefore, the timing control circuit 322 sets the enable period T2 of the touch driving signal S_TX to not overlap with the noise interference duration T1 of the noise duration signal S_ND in time according to the noise duration signal S_ND. In this way, the interference on the sensing signal S_RX by the noise signals 410 and 420 can be reduced, thereby improving the accuracy of the sensing data S_D. In the present embodiment, the enable period T2 of the touch driving signal S_TX is set by the timing control circuit 322, but the invention is not limited thereto. In another embodiment, the enable period T2 of the touch driving signal S_TX may be set by other circuits.

On the other hand, the demodulation signal RX_dem has a first level LV1 and a second level LV2. The demodulation signal RX_dem has the first level LV1 during a first demodulation period T3. For example, the first level LV1 and the second level LV2 are, for example, respectively voltage values of 1 volt and −1 volt, and the demodulator circuit 244 performs the demodulation operation on the sensing signal S_RX using the voltage value of 1 volt during the first demodulation period T3. In the embodiment, the timing control circuit 322 sets the first demodulation period T3 of the demodulation signal RX_dem to overlap with the enable period T2 of the touch driving signal S_TX in time according to the noise duration signal S_ND, and the duty cycles of the demodulation signal RX_dem and the touch driving signal S_TX are both set to 30%, so that the touch sensing circuit 324 may obtain a larger signal amount. In FIG. 4, the first demodulation period T3 and the enable period T2 substantially completely overlap in time. In the present embodiment, the first demodulation period T3 of the demodulation signal RX_dem is set by the timing control circuit 322, but the invention is not limited thereto. In another embodiment, the first demodulation period T3 of the demodulation signal RX_dem may be set by other circuits.

In addition, since the enable period T2 of the touch driving signal S_TX does not overlap with the noise interference duration T1 of the noise duration signal S_ND in time, the first demodulation period T3 of the demodulation signal RX_dem also does not overlap with the noise interference duration T1 of the noise duration signal S_ND in time. In other words, the timing control circuit 322 may also set the first demodulation period T3 of the demodulation signal RX_dem to not overlap with the noise interference duration T1 of the noise duration signal S_ND in time according to the noise duration signal S_ND.

Regarding the hardware structure of elements in FIG. 3, the timing control circuit 322 may be a processor with computation ability. Alternatively, the timing control circuit 322 may be designed through a hardware description language (HDL) or any other digital circuit design manner familiar to persons skilled in the art and may be a hardware circuit implemented through a field programmable gate array (FPGA), a complex programmable logic device (CPLD), or an application-specific integrated circuit (ASIC). In addition, sufficient teachings, suggestions, and implementation explanations on the hardware structures of the AFE circuit 242, the demodulator circuit 244, the filter circuit 246, and the accumulator circuit 248 may be obtained by referring to common knowledge in the art.

Figure 5:
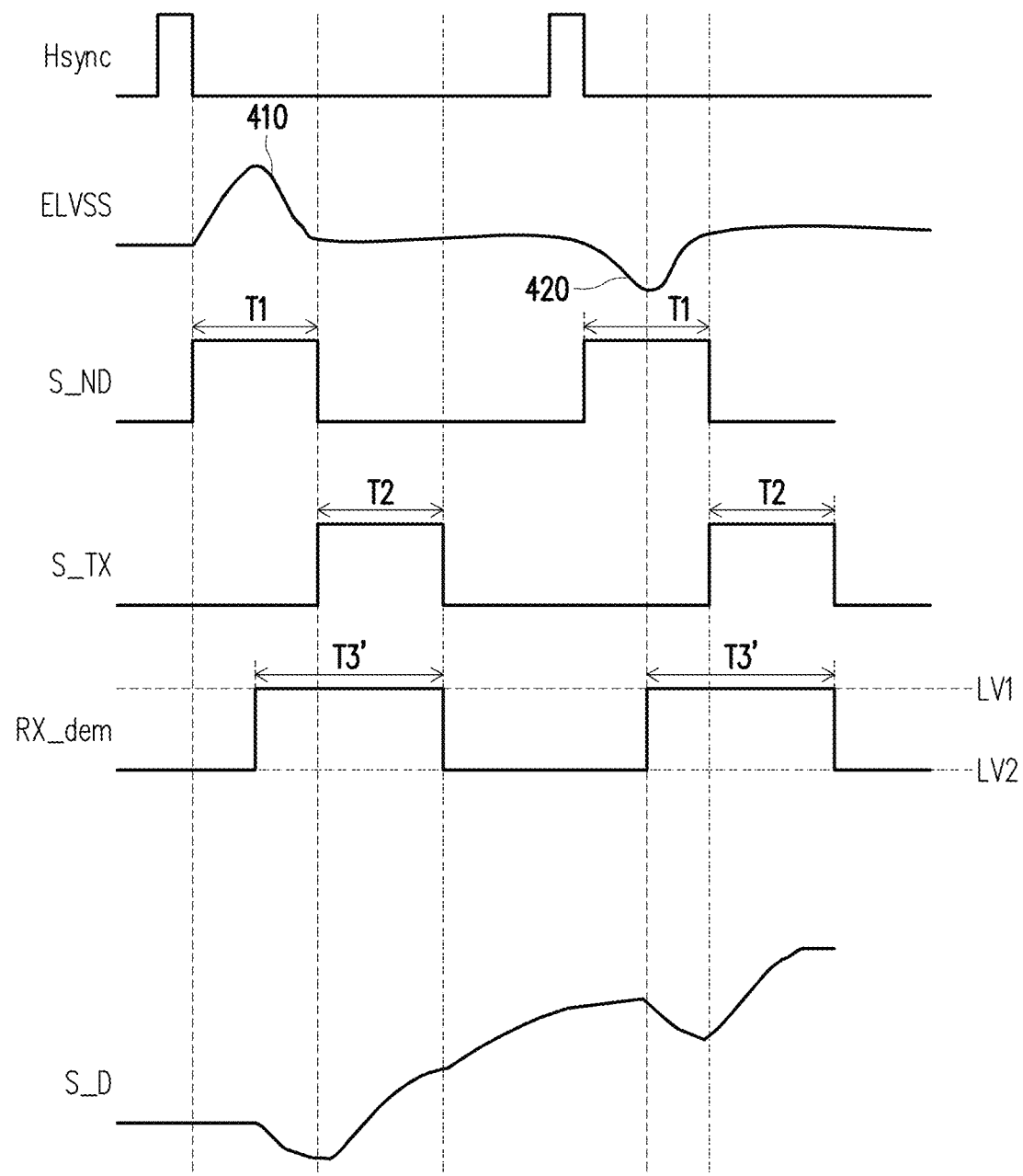
FIG. 5 is a schematic diagram of a waveform of each signal in the driver circuit according to another embodiment of the disclosure.

FIG. 5 is a schematic diagram of a waveform of each signal in the driver circuit according to another embodiment of the disclosure. Please refer to FIG. 3 to FIG. 5. In the embodiment of FIG. 4, the first demodulation period T3 of the demodulation signal RX_dem is set to completely overlap with the enable period T2 of the touch driving signal S_TX in time, and the duty cycles of the demodulation signal RX_dem and the touch driving signal S_TX are both set to 30%, but the disclosure is not limited thereto.

In the embodiment of FIG. 5, the duty cycle of the demodulation signal RX_dem is set to 50%, the duty cycle of the touch driving signal S_TX is still maintained at 30%, and a first demodulation period T3' of the demodulation signal RX_dem is set to at least partially overlap with the enable period T2 of the touch driving signal S_TX in time.

Specifically, in the embodiment, the timing control circuit 322 sets the first demodulation period T3' of the demodulation signal RX_dem to at least partially overlap with the enable period T2 of the touch driving signal S_TX in time according to the noise duration signal S_ND. Furthermore, the timing control circuit 322 sets the first demodulation period T3' of the demodulation signal RX_dem to at least partially overlap with the noise interference duration T1 of the noise duration signal S_ND in time according to the noise duration signal S_ND. In addition, the timing control circuit 322 also determines the duty cycle of the demodulation signal RX_dem, such as setting the duty cycle of the demodulation signal RX_dem to 50%, according to the noise duration signal S_ND. In this way, the spectrum energy of the demodulated sensing signal S_RX may be concentrated on the main frequency, so the resistance to noise outside the main frequency is high.

Figure 6:
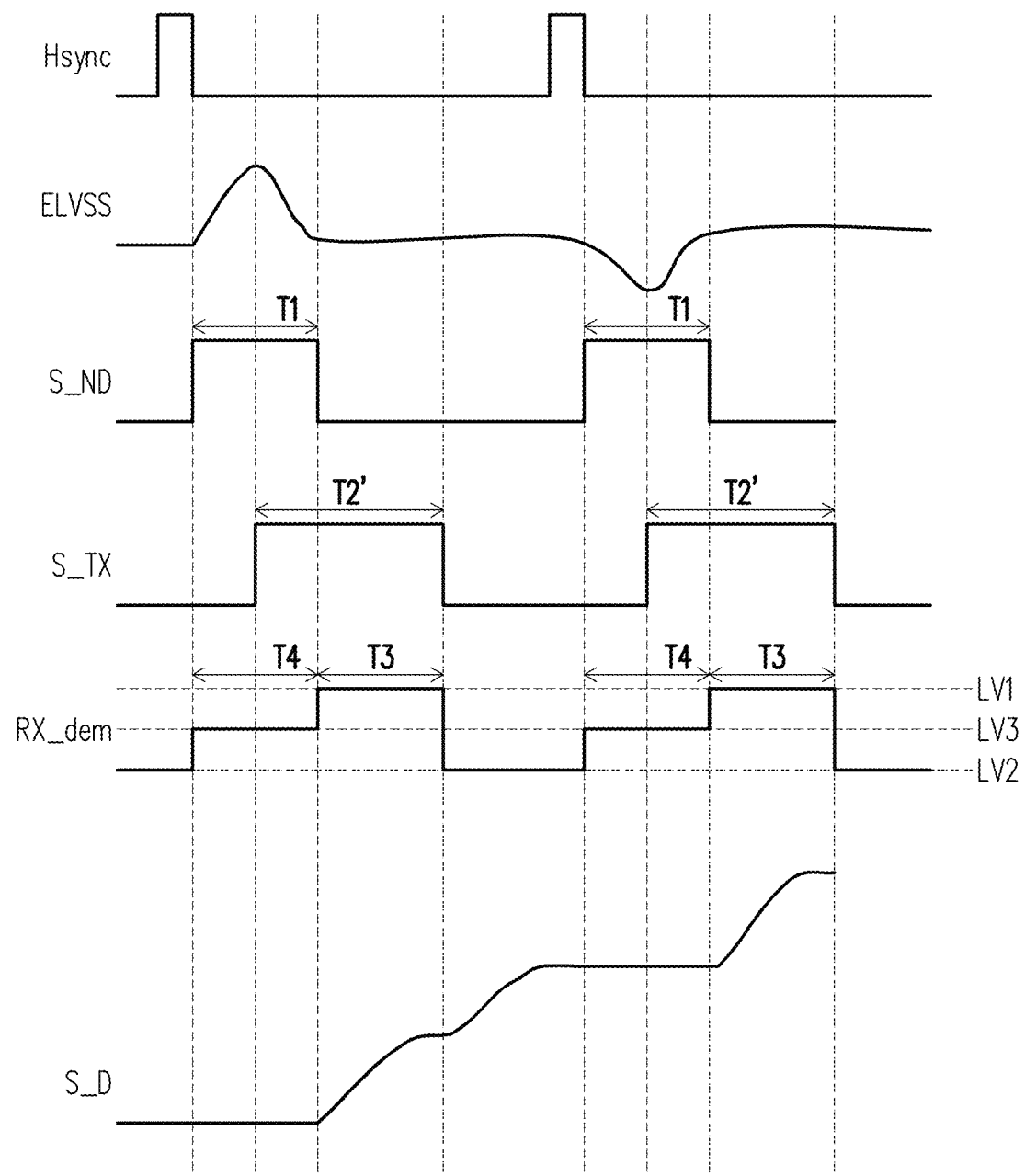
FIG. 6 is a schematic diagram of a waveform of each signal in the driver circuit according to another embodiment of the disclosure.

FIG. 6 is a schematic diagram of a waveform of each signal in the driver circuit according to another embodiment of the disclosure. Please refer to FIG. 3, FIG. 4, and FIG. 6. In the embodiment of FIG. 4, the enable period T2 of the touch driving signal S_TX is set to not overlap with the noise interference duration T1 of the noise duration signal S_ND in time, and the duty cycle of the touch driving signal S_TX is 30%, but the disclosure is not limited thereto.

In the embodiment of FIG. 6, the duty cycle of the touch driving signal S_TX is set to 50%, and the enable period T2 of the touch driving signal S_TX is set to at least partially overlap with the noise interference duration T1 of the noise duration signal S_ND in time.

Specifically, in the embodiment, the timing control circuit 322 sets an enable period T2' of the touch driving signal S_TX to at least partially overlap with the noise interference duration T1 of the noise duration signal S_ND in time according to the noise duration signal S_ND. In addition, the timing control circuit 322 also determines the duty cycle of the touch driving signal S_TX, such as setting the duty cycle of the touch driving signal S_TX to 50%, according to the noise duration signal S_ND.

On the other hand, the demodulation signal RX_dem has the first level LV1, the second level LV2, and a third level LV3. The demodulation signal RX_dem has the first level LV1 in the first demodulation period T3, and the demodulation signal RX_dem has the third level LV3 in a second demodulation period T4. The signal levels LV1 and LV3 of the demodulation signal RX_dem in the first demodulation period T3 and the second demodulation period T4 are different. For example, the first level LV1, the second level LV2, and the third level LV3 are, for example, respectively voltage values of 1 volt, −1 volt, and 0 volt. The demodulator circuit 244 performs the demodulation operation on the sensing signal S_RX using the voltage value of 0 volt during the second demodulation period T4, which means that the demodulator circuit 244 stops performing the demodulation operation on the sensing signal S_RX during the second demodulation period T4. In this way, the interference on the sensing signal S_RX by the noise signals 410 and 420 can be reduced, thereby improving the accuracy of the sensing data S_D.

In the embodiment, the timing control circuit 322 sets the second demodulation period T4 of the demodulation signal RX_dem to at least partially overlap with the enable period T2' of the touch driving signal S_TX in time according to the noise duration signal S_ND. In addition, the timing control circuit 322 also sets the second demodulation period T4 of the demodulation signal RX_dem to overlap with the noise interference duration T1 of the noise duration signal S_ND in time according to the noise duration signal S_ND. In FIG. 6, the second demodulation period T4 and the noise interference duration T1 substantially completely overlap in time. In the present embodiment, the second demodulation period T4 of the demodulation signal RX_dem is set by the timing control circuit 322, but the invention is not limited thereto. In another embodiment, the second demodulation period T4 of the demodulation signal RX_dem may be set by other circuits.

Figure 7:
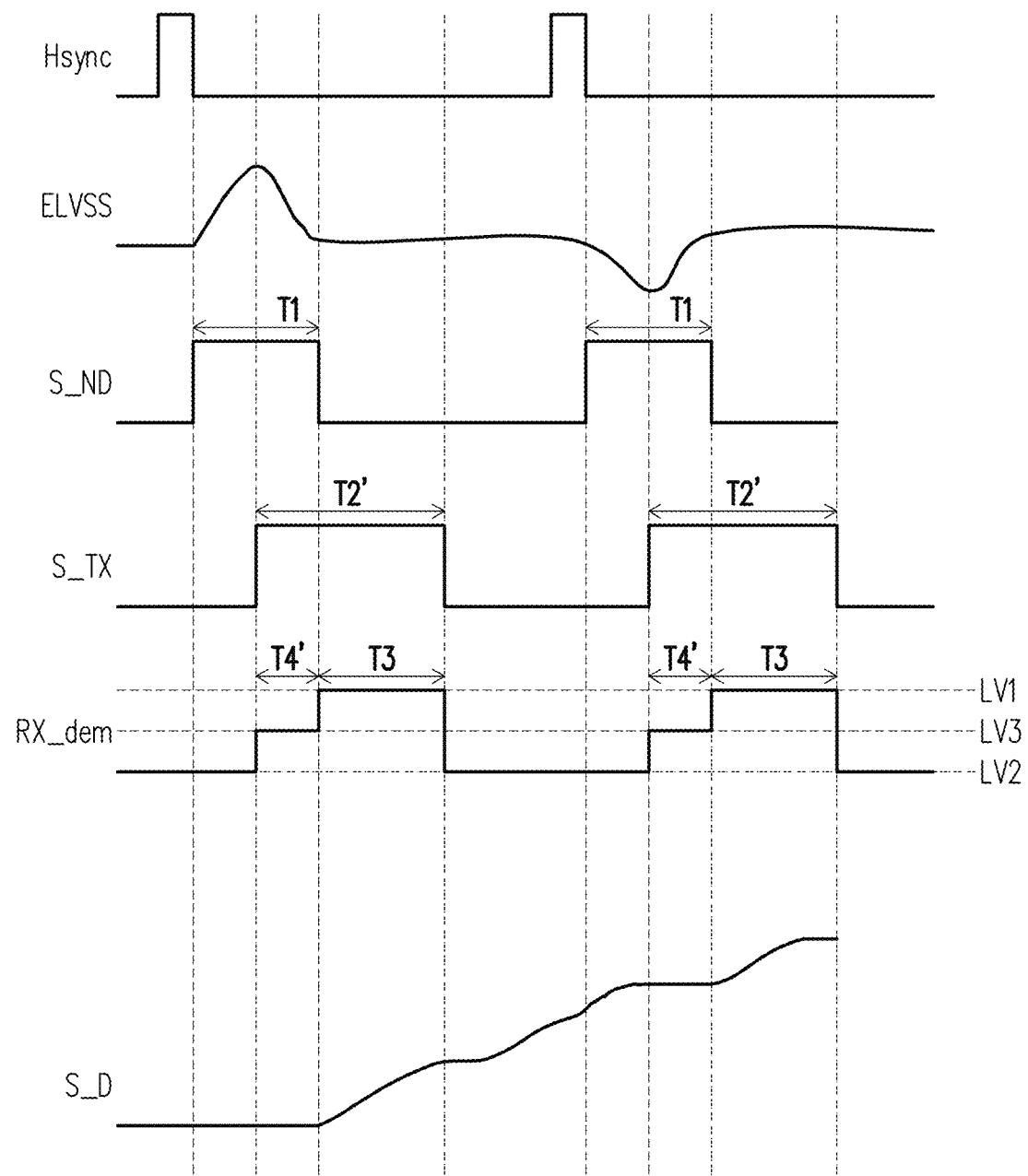
FIG. 7 is a schematic diagram of a waveform of each signal in the driver circuit according to another embodiment of the disclosure.

FIG. 7 is a schematic diagram of a waveform of each signal in the driver circuit according to another embodiment of the disclosure. Please refer to FIG. 3, FIG. 6, and FIG. 7. In the embodiment of FIG. 6, the second demodulation period T4 of the demodulation signal RX_dem is set to overlap with the noise interference duration T1 of the noise duration signal S_ND in time, but the disclosure is not limited thereto.

In the embodiment of FIG. 7, a second demodulation period T4' of the demodulation signal RX_dem is set to at least partially overlap with the noise interference duration T1 of the noise duration signal S_ND in time. Specifically, in the embodiment, the timing control circuit 322 sets the second demodulation period T4' of the demodulation signal RX_dem to at least partially overlap with the noise interference duration T1 of the noise duration signal S_ND in time according to the noise duration signal S_ND. In this way, the interference on the sensing signal S_RX by the noise signals 410 and 420 can also be reduced, thereby improving the accuracy of the sensing data S_D.

In the embodiment of FIG. 5 to FIG. 7, the timing control circuit 322 may determine the timing and the duty cycle of the touch driving signal S_TX and the demodulation signal RX_dem according to the noise duration signal S_ND or control the converter circuit 244 to stop performing the demodulation operation on the sensing signal S_RX during the noise interference duration T1. Through such a driving manner, the interference on the sensing signal S_RX by the noise signals 410 and 420 can be reduced, thereby improving the accuracy of the sensing data S_D.

Next, it is explained that the display driver circuit 310 may regularly output the noise duration signal S_ND or may output the noise duration signal S_ND according to the degree of interference on the image screen.

Figure 8:
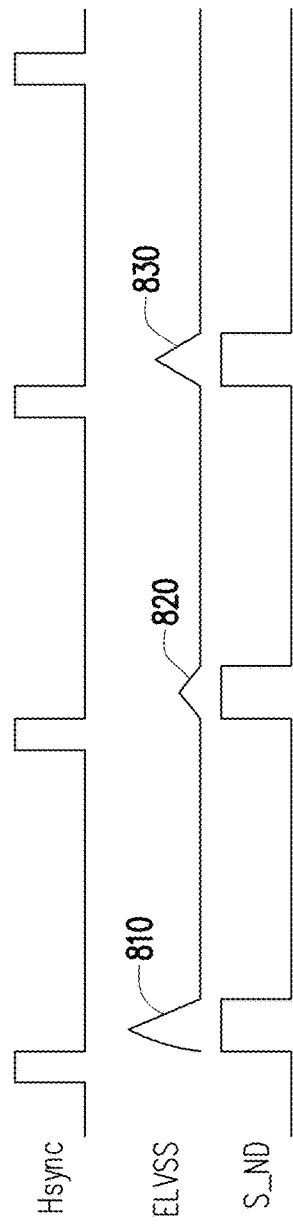
FIG. 8 is a schematic diagram of a waveform of each signal in the driver circuit according to another embodiment of the disclosure.

FIG. 8 is a schematic diagram of a waveform of each signal in the driver circuit according to another embodiment of the disclosure. Please refer to FIG. 8. In the embodiment, regardless of whether noise signals 810, 820, and 830 are greater than a threshold, the display driver circuit 310 outputs the noise duration signal S_ND to the timing control circuit 322 at a fixed frequency according to the horizontal synchronization signal Hsync. The fixed frequency is, for example, the same as the frequency of the horizontal synchronization signal Hsync, but the disclosure is not limited thereto.

Figure 9A:
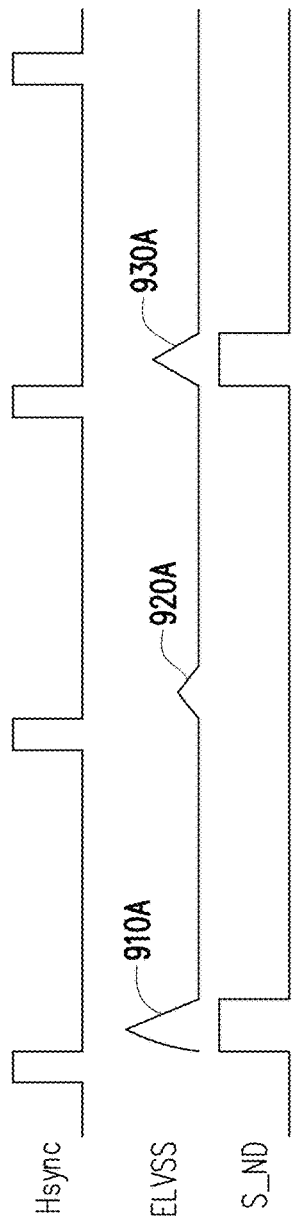
FIG. 9A and FIG. 9B are schematic diagrams of a waveform of each signal in the driver circuit according to different embodiments of the disclosure.
Figure 9B:
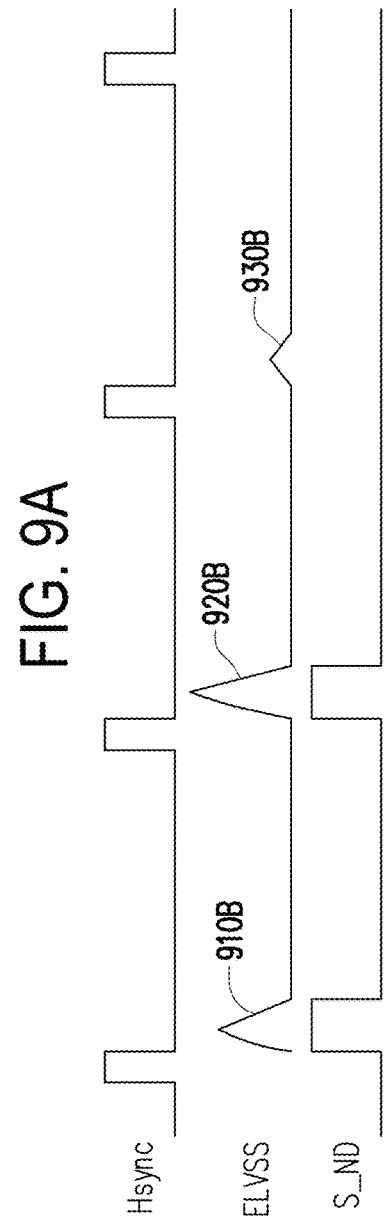

FIG. 9A and FIG. 9B are schematic diagrams of a waveform of each signal in the driver circuit according to different embodiments of the disclosure. Please refer to FIG. 9A and FIG. 9B. FIG. 9A and FIG. 9B illustrate situations of the reference voltage ELVSS being interfered by the noise signal during the noise interference duration for different degrees of interference on the image screen. When the noise signal is greater than the threshold, the display driver circuit 310 outputs the noise duration signal S_ND to the timing control circuit 322.

For example, in FIG. 9A, noise signals 910A and 930A are greater than the threshold, and a noise signal 920A is less than or equal to the threshold. When the noise signals 910A and 930A are greater than the threshold, the display driver circuit 310 outputs the noise duration signal S_ND to the timing control circuit 322. When the noise signal 920A is less than or equal to the threshold, the display driver circuit 310 does not output the noise duration signal S_ND to the timing control circuit 322.

In FIG. 9B, noise signals 910B and 920B are greater than the threshold, and a noise signal 930B is less than or equal to the threshold. When the noise signals 910B and 920B are greater than the threshold, the display driver circuit 310 outputs the noise duration signal S_ND to the timing control circuit 322. When the noise signal 930B is less than or equal to the threshold, the display driver circuit 310 does not output the noise duration signal S_ND to the timing control circuit 322.

Figure 10:
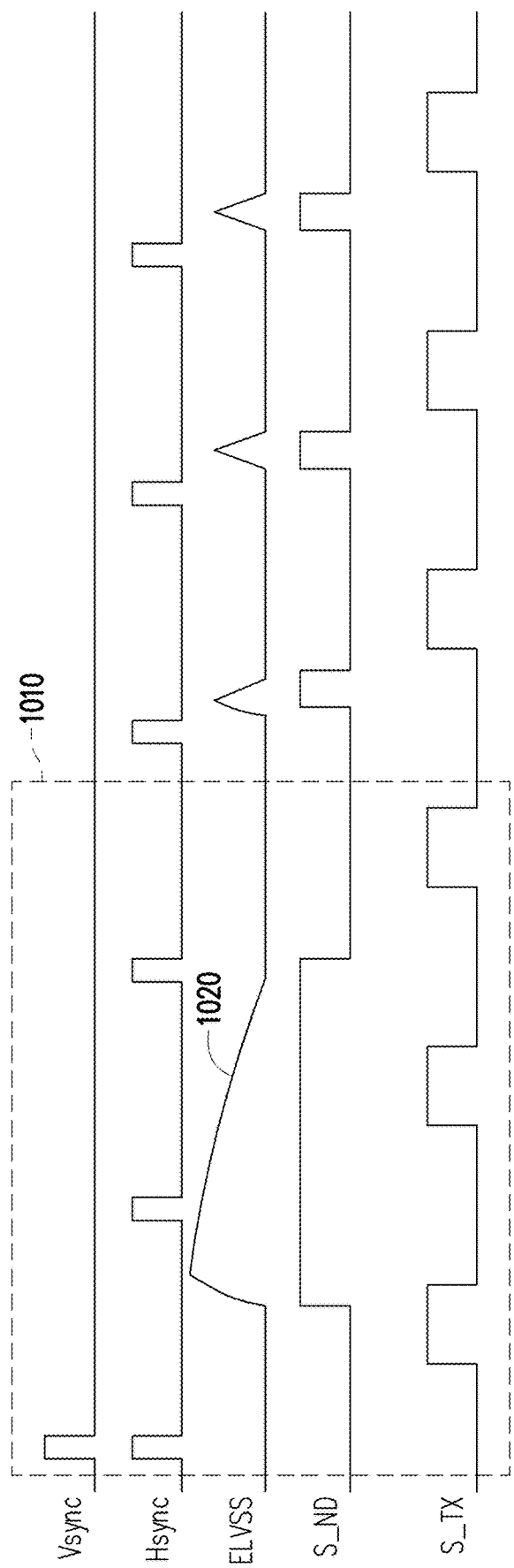
FIG. 10 is a schematic diagram of a waveform of each signal in the driver circuit according to another embodiment of the disclosure.

FIG. 10 is a schematic diagram of a waveform of each signal in the driver circuit according to another embodiment of the disclosure. Please refer to FIG. 10. Generally, the reference voltage ELVSS usually changes during a vertical front porch period 1010 to reduce the influence on display quality. FIG. 10 illustrates that the reference voltage ELVSS has a large voltage change 1020 during the vertical front porch period 1010. When the reference voltage ELVSS has the large voltage change 1020 during the vertical front porch period 1010, the display driver circuit 310 outputs the noise duration signal S_ND to the timing control circuit 322. The timing control circuit 322 may determine whether to omit the sensing data S_D according to the noise duration signal S_ND. In another embodiment, if the voltage change 1020 is not caused by noise, but by the voltage adjustment of the reference voltage ELVSS, the timing control circuit 322 may determine not to omit the sensing data S_D according to the noise duration signal S_ND.

In the embodiment of FIG. 3, the driver circuit 300 may be implemented in at least two semiconductor chips. A first semiconductor chip includes the timing control circuit 322 and the touch sensing circuit 324, and a second semiconductor chip includes the display driver circuit 310. However, the disclosure is not limited thereto.

Figure 11:
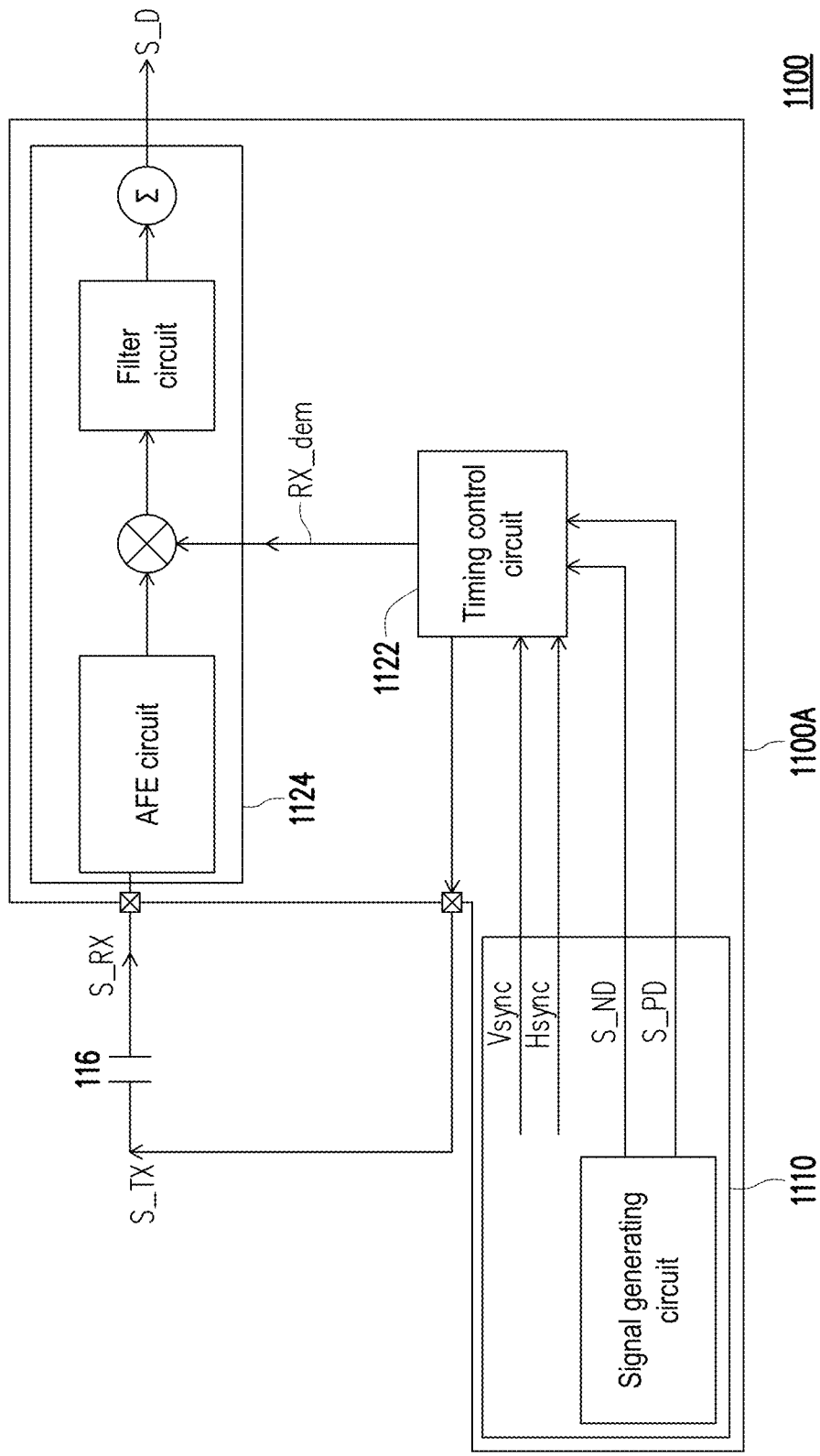
FIG. 11 is a schematic block diagram of a driver circuit according to another embodiment of the disclosure.

FIG. 11 is a schematic block diagram of a driver circuit according to another embodiment of the disclosure. Please refer to FIG. 11, the driver circuit 1100 may be implemented in a single semiconductor chip 1100A. The semiconductor chip 1100A includes a timing control circuit 1122, a touch sensing circuit 1124, and a display driver circuit 1110.

Figure 12:
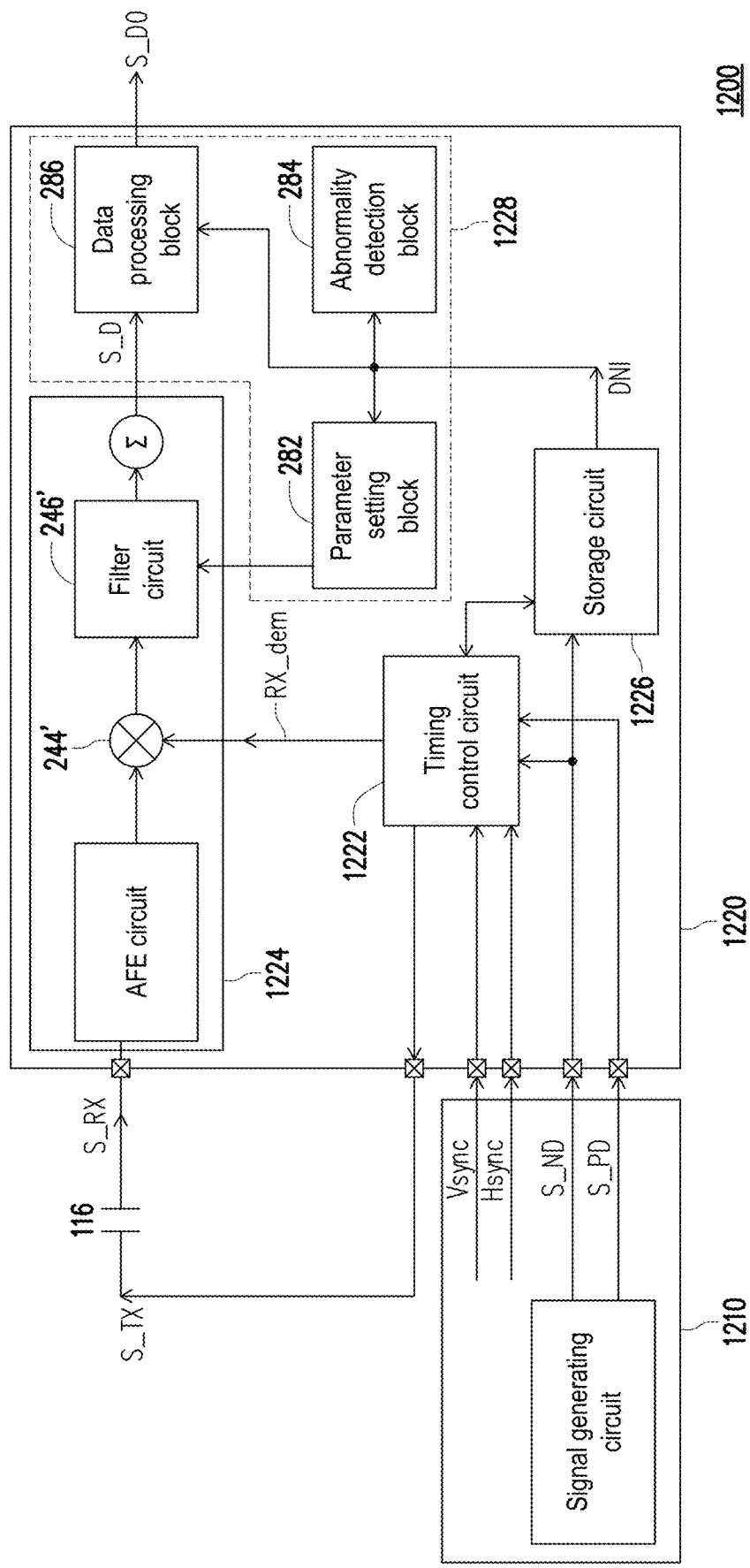
FIG. 12 is a schematic block diagram of a driver circuit according to another embodiment of the disclosure.

FIG. 12 is a schematic block diagram of a driver circuit according to another embodiment of the disclosure. Please refer to FIG. 12. In the embodiment, a touch driver circuit 1220 may collect information of the reference voltage ELVSS being interfered by the noise signal according to the noise duration signal S_ND to perform operations such as filter setting, rescanning, or data correction.

Specifically, the driver circuit 1200 includes a display driver circuit 1210 and the touch driver circuit 1220. The touch driver circuit 1220 includes a timing control circuit 1222, a touch sensing circuit 1224, a storage circuit 1226, and a digital circuit 1228. The digital circuit 1228 is coupled to the timing control circuit 1222, the touch sensing circuit 1224, and the storage circuit 1226. The storage circuit 1226 receives the noise duration signal S_ND and is configured to store information DNI of the reference voltage ELVSS being interfered by the noise signal. The digital circuit 1228 may perform operations such as filter setting, rescanning, or data correction according to the information DNI stored in the storage circuit 1226.

Figure 13:
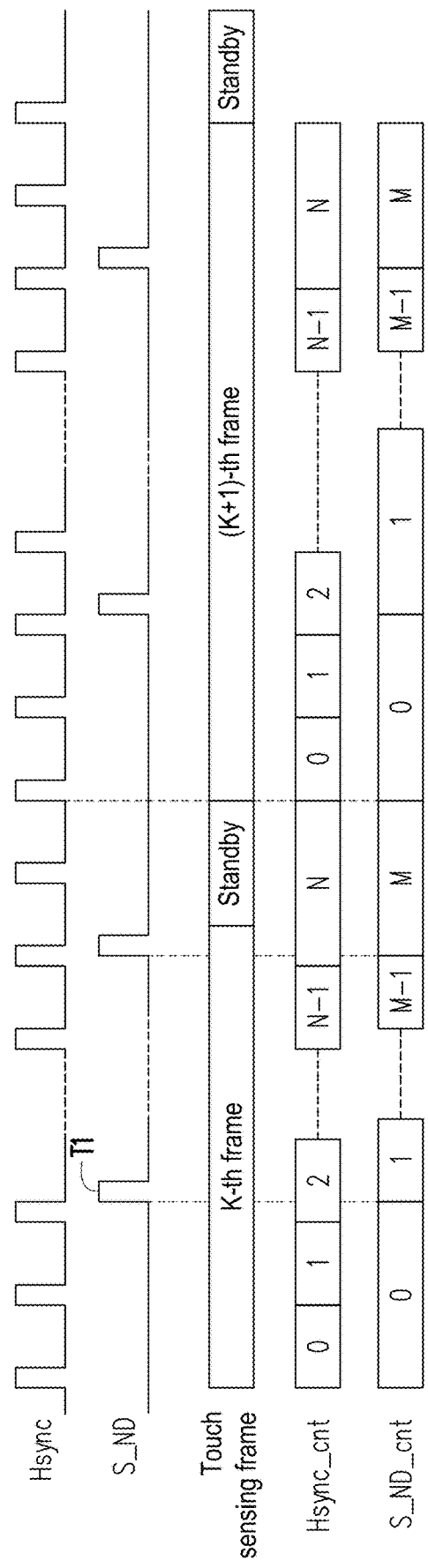
FIG. 13 is a schematic diagram of a horizontal synchronization signal and a noise duration signal and count values of the two in different touch sensing frames according to an embodiment of the disclosure.
Figure 14A:
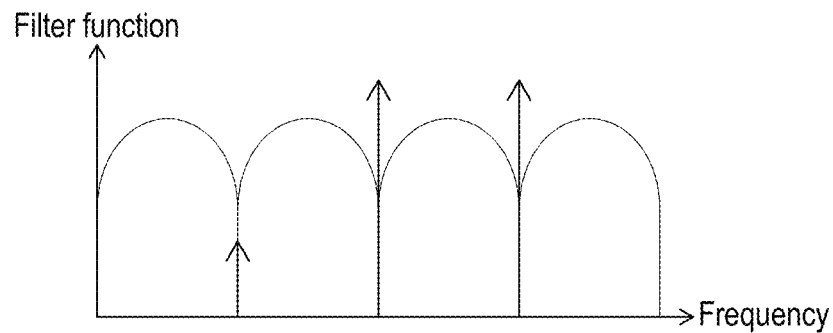
FIG. 14A and FIG. 14B are schematic diagrams of a filter setting according to different embodiments of the disclosure.
Figure 14B:
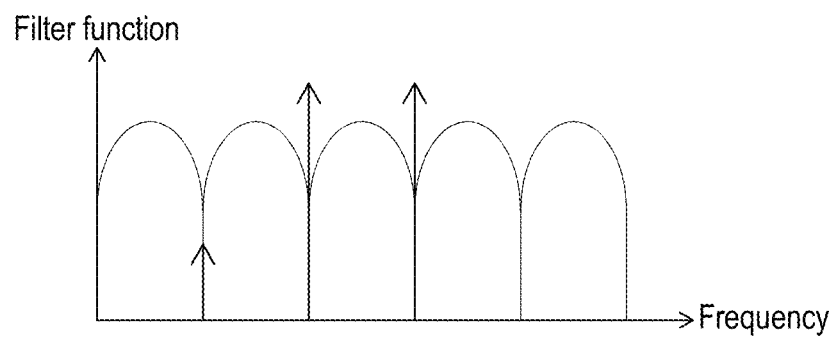

FIG. 13 is a schematic diagram of a horizontal synchronization signal and a noise duration signal and count values of the two in different touch sensing frames according to an embodiment of the disclosure. FIG. 14A and FIG. 14B are schematic diagrams of a filter setting according to different embodiments of the disclosure. Please refer to FIG. 12 to FIG. 14B. The digital circuit 1228 includes a parameter setting block 282. The parameter setting block 282 may count the number of the noise interference durations T1 of different touch sensing frames according to the noise duration signal S_ND. Then, the parameter setting block 282 adjusts a filtering parameter of a filter circuit 246' according to a count result. For example, the parameter setting block 282 may adjust a filter function as shown in FIG. 14A and FIG. 14B according to the count result.

Specifically, FIG. 13 illustrates the count values of the horizontal synchronization signal Hsync and the noise duration signal S_ND of a K-th frame and a (K+1)-th frame of the touch sensing frames. In the K-th frame and the (K+1)-th frame, a count value (square wave number) Hsync_cnt of the horizontal synchronization signal Hsync is N, and a count value (square wave number) S_ND_cnt of the noise duration signal S_ND is M, where K, M, and N are integers greater than 1. In the K-th frame, the filter function of the filter circuit 246' is set as shown in FIG. 14A, for example, F×0.5, where F is a preset filter function. Considering that a ratio of count results of the noise duration signal S_ND and the horizontal synchronization signal Hsync is M/N, in the (K+1)-th frame, the filter function of the filter circuit 246' may be set as shown in FIG. 14B, for example, F×(M/N).

Figure 15:
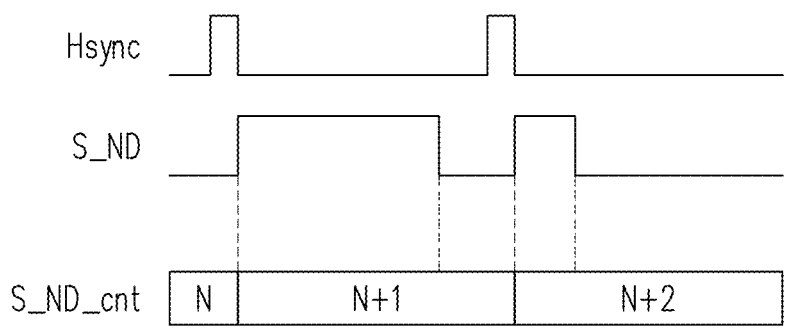
FIG. 15 is a schematic diagram of a noise duration signal and a count value thereof according to an embodiment of the disclosure.

FIG. 15 is a schematic diagram of a noise duration signal and a count value thereof according to an embodiment of the disclosure. Please refer to FIG. 12 and FIG. 15. The digital circuit 1228 includes an abnormality detection block 284. The abnormality detection block 284 may compute a time length of a single noise interference duration 1510 of the noise duration signal S_ND or a cumulative time length of multiple noise interference durations 1510 and 1520 according to the noise duration signal S_ND. Then, the abnormality detection block 284 outputs a computation result to the timing control circuit 1222.

Taking the noise interference duration 1510 as an example, when the computation result (that is, the time length of the noise interference duration 1510) is greater than a first threshold, it means that there is too much noise interference, and the timing control circuit 1222 may choose to omit the sensing data, and perform sensing again.

Taking the noise interference durations 1510 and 1520 as an example, when the computation result (that is, the cumulative time length of the noise interference durations 1510 and 1520) is greater than a second threshold, it means that too much noise interference is accumulated, and the timing control circuit 1222 may also choose to omit the sensing data, and perform sensing again. The second threshold is greater than the first threshold.

Figure 16:
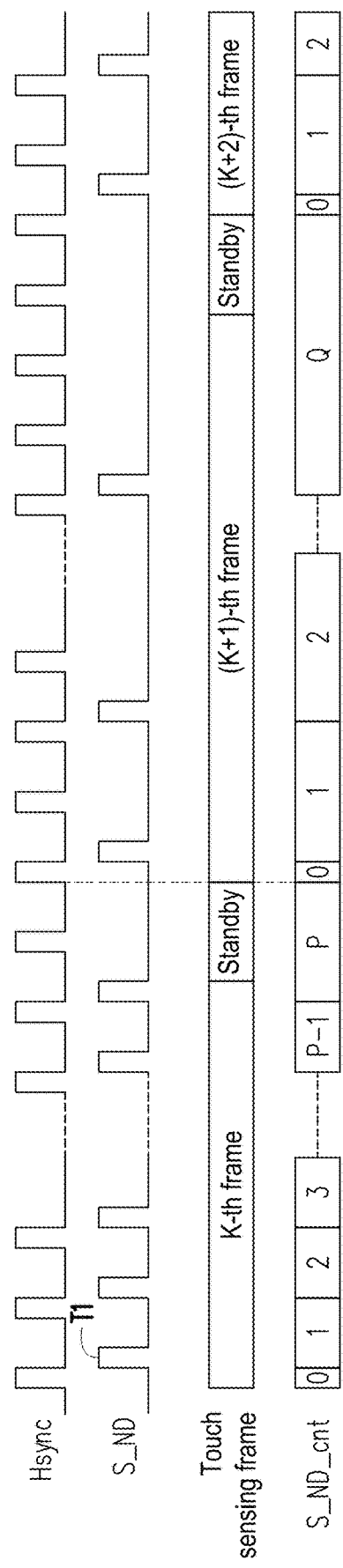
FIG. 16 is a schematic diagram of a noise duration signal and a count value thereof in different touch sensing frames according to an embodiment of the disclosure.

FIG. 16 is a schematic diagram of a noise duration signal and a count value thereof in different touch sensing frames according to an embodiment of the disclosure. Please refer to FIG. 12 and FIG. 16. The abnormality detection block 284 may compute a difference value of the number of the noise interference durations T1 of the noise duration signal S_ND of different touch sensing frames according to the noise duration signal S_ND. Then, the abnormality detection block 284 outputs a computation result to the timing control circuit 1222.

For example, in the embodiment, the count values of the noise duration signal S_ND in the K-th frame and the (K+1)-th frame of the touch sensing frames are, for example, respectively P and Q, where P and Q are integers greater than 1. The abnormality detection block 284 computes a difference value of P and Q, and outputs a computation result to the timing control circuit 1222. When the computation result (that is, the difference value of P and Q) is greater than a threshold, the timing control circuit 1222 may choose to omit the sensing data, and perform sensing again.

Figure 17:
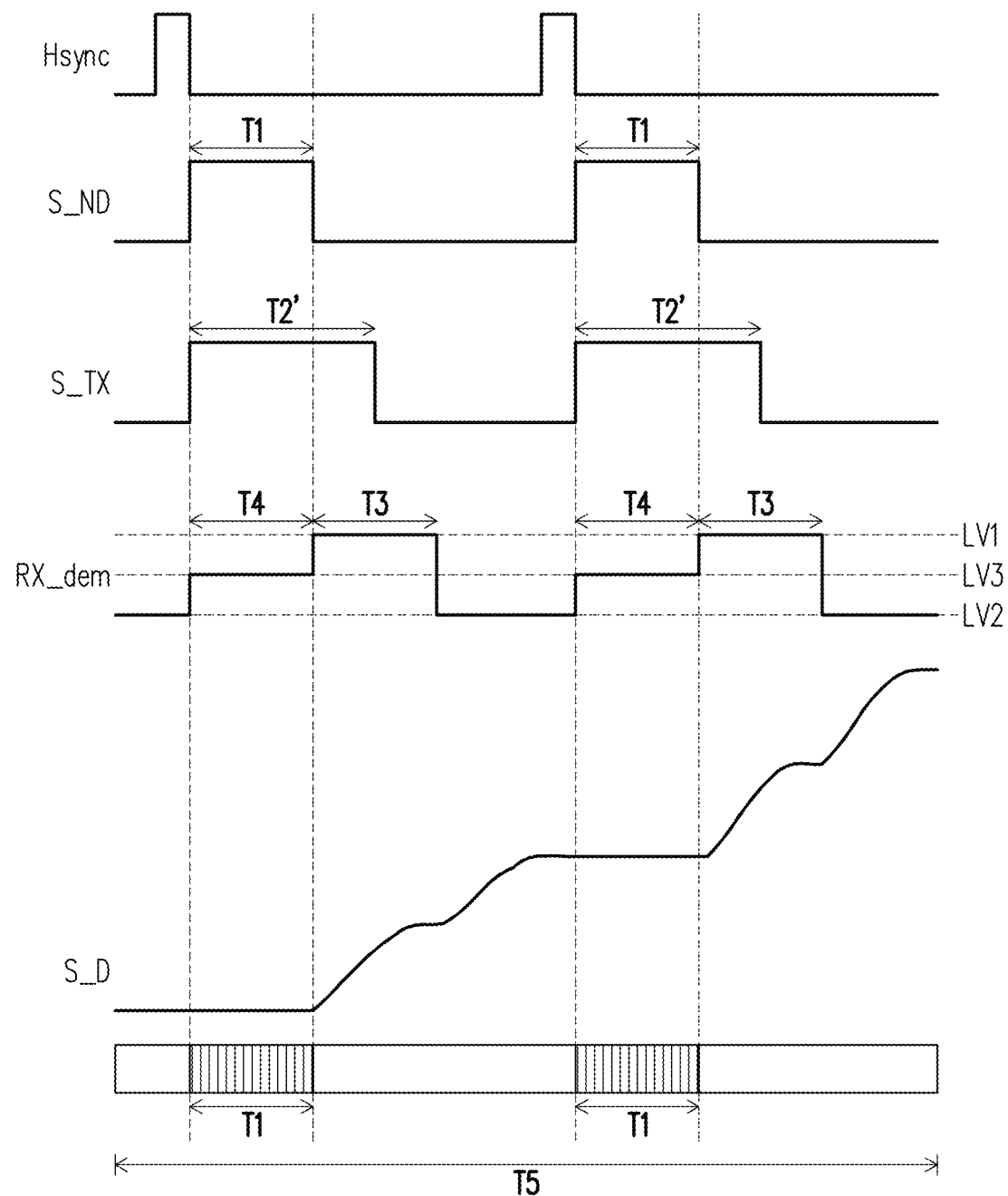
FIG. 17 is a schematic diagram of a waveform of each signal in the driver circuit according to another embodiment of the disclosure.

FIG. 17 is a schematic diagram of a waveform of each signal in the driver circuit according to another embodiment of the disclosure. Please refer to FIG. 12 and FIG. 17. The digital circuit 1228 includes a data processing block 286. The data processing block 286 may compute the cumulative time length of multiple noise interference durations T1 according to the noise duration signal S_ND. Then, the data processing block 286 normalizes the sensing data S_D according to a computation result to output normalized sensing data S_D0.

Specifically, in FIG. 17, a demodulator circuit 244' performs the demodulation operation on the sensing signal S_RX using the voltage value of 0 volt during the second demodulation period T4, which means that the demodulator circuit 244' stops performing the demodulation operation on the sensing signal S_RX during the second demodulation period T4. Since the demodulator circuit 244' does not perform the demodulation operation on the sensing signal S_RX during the second demodulation period T4, in order to reduce the accumulation of data during this period that affects the accuracy of the sensing data S_D, the data processing block 286 normalizes the sensing data S_D.

For example, the data processing block 286 may normalize the sensing data S_D according to the following formula: $S\_D0=S\_Dx[1+\alpha \times (T1/T5)]$, where a is a normalization parameter, T1 is the cumulative time length of multiple noise interference durations, and T5 is the total length of the sensing time.

Regarding the hardware structure of elements in FIG. 12, the digital circuit 1228 may be designed through hardware description language (HDL) or any other digital circuit design manner familiar to persons skilled in the art and may be a hardware circuit implemented through a field programmable gate array (FPGA), a complex programmable logic device (CPLD), or an application-specific integrated circuit (ASIC). In addition, sufficient teachings, suggestions, and implementation explanations on the hardware structure of the storage circuit 1226 may be obtained by referring to common knowledge in the art.

Please refer to FIG. 3 again. Next, it is explained that the timing control circuit 322 may determine the timing of the touch driving signal S_TX according to the prohibit duration signal S_PD to drive the sensor 116 to generate the sensing signal S_RX. Alternatively, the timing control circuit 322 may also determine the slew rate of the touch driving signal S_TX according to the prohibit duration signal S_PD.

Figure 18:
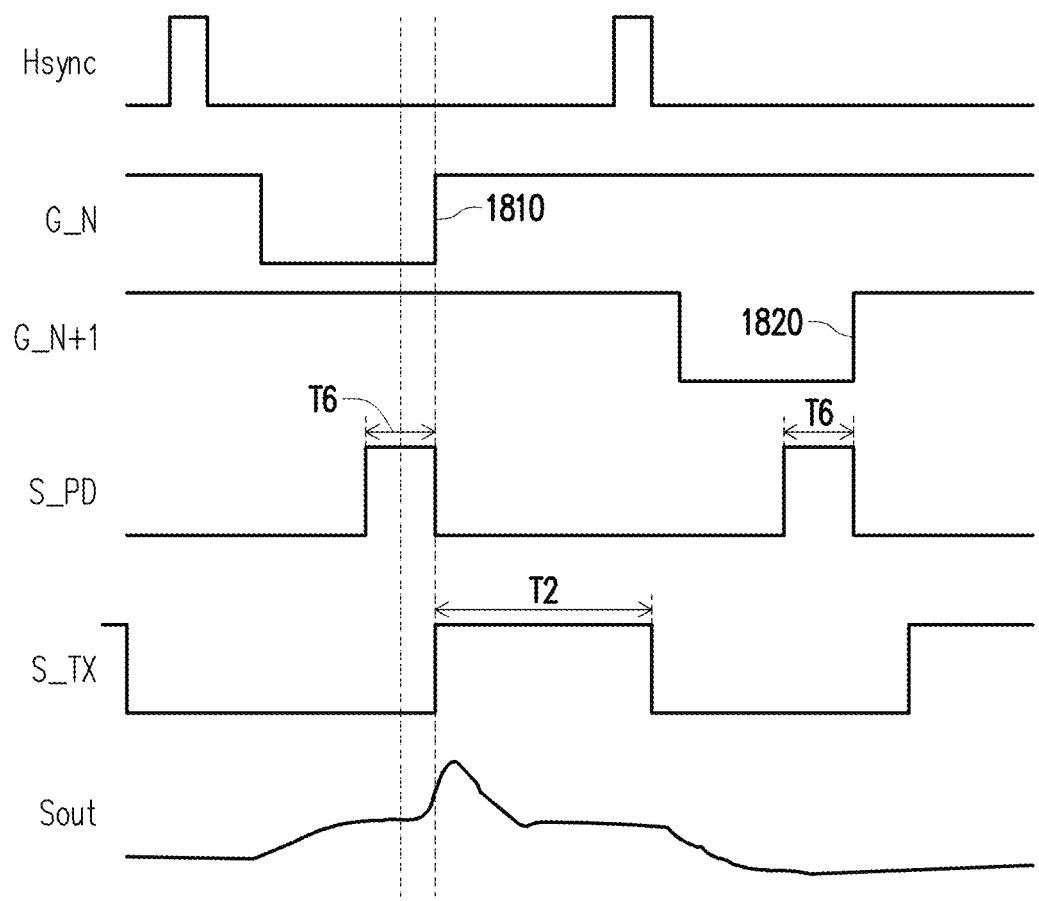
FIG. 18 is a schematic diagram of a waveform of each signal in the driver circuit according to another embodiment of the disclosure.

FIG. 18 is a schematic diagram of a waveform of each signal in the driver circuit according to another embodiment of the disclosure. Please refer to FIG. 3 and FIG. 18. In FIG. 18, a signal G_N is a gate signal driving a gate line in the touch display panel 100, and a signal G_N+1 is a gate signal driving the next gate line in the touch display panel 100. A signal Sout is a changing waveform of a data signal on a data line of the touch display panel 100.

In order to prevent the touch driver circuit 320 from performing a touch sensing operation when the gate signals G_N and G_N+1 transition, causing the touch driving signal S_TX to affect the data signal Sout, the display driver circuit 310 outputs the prohibit duration signal S_PD to the timing control circuit 322 when the gate signals G_N and G_N+1 are about to transition. The prohibit duration signal S_PD is configured to indicate whether the gate signals G_N and G_N+1 are in transition. For example, after an enable period T6 of the prohibit duration signal S_PD, the gate signals G_N and G_N+1 transition, such as rising edges 1810 and 1820. Therefore, the timing control circuit 322 may determine the timing of the touch driving signal S_TX according to the prohibit duration signal S_PD.

For example, the timing control circuit 322 may set the timing of the touch driving signal S_TX according to the prohibit duration signal S_PD to enter the enable period T2 after the enable period T6 of the prohibit duration signal S_PD, thereby driving the sensor 116 to generate the sensing signal S_RX. In this way, the interference on the data signal Sout by the touch driving signal S_TX when the gate signal transitions can be reduced, thereby improving the accuracy of the data signal Sout.

Figure 19:
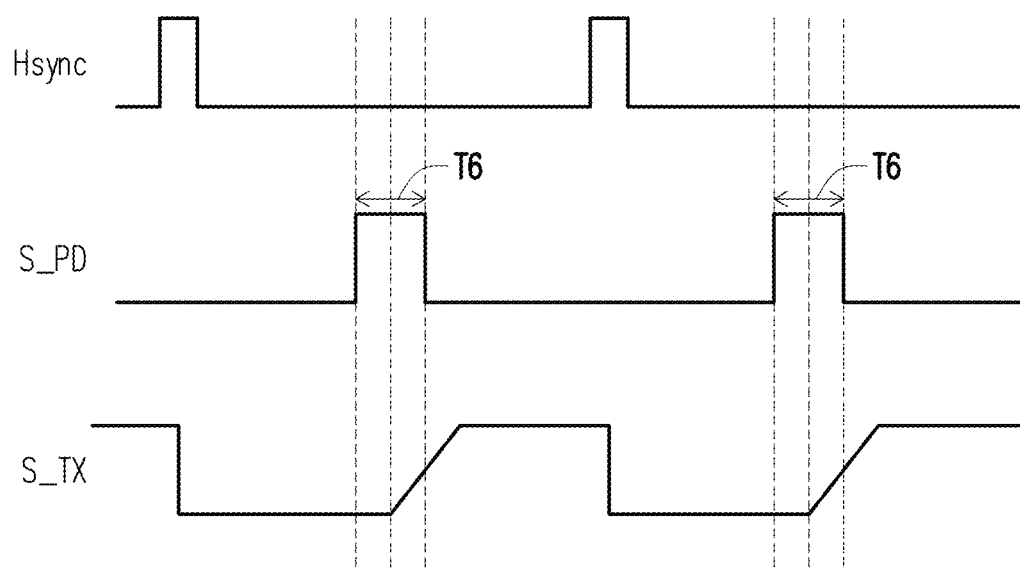
FIG. 19 is a schematic diagram of a waveform of each signal in the driver circuit according to another embodiment of the disclosure.

FIG. 19 is a schematic diagram of a waveform of each signal in the driver circuit according to another embodiment of the disclosure. Please refer to FIG. 3 and FIG. 19. In FIG. 19, in order to prevent the touch driver circuit 320 from performing the touch sensing operation when the gate signals G_N and G_N+1 transition, causing the touch driving signal S_TX to affect the data signal Sout, the display driver circuit 310 outputs the prohibit duration signal S_PD to the timing control circuit 322 when the gate signals G_N and G_N+1 are about to transition. The prohibit duration signal S_PD is configured to indicate whether the gate signals G_N and G_N+1 are in transition. For example, after the enable period T6 of the prohibit duration signal S_PD, the gate signals G_N and G_N+1 transition, such as the rising edges 1810 and 1820.

Therefore, the timing control circuit 322 may determine the slew rate of the touch driving signal S_TX according to the prohibit duration signal S_PD. In this way, the interference on the data signal Sout by the touch driving signal S_TX when the gate signal transitions can be reduced, thereby improving the accuracy of the data signal Sout.

In summary, in the embodiments of the disclosure, the timing control circuit may determine the timing of the touch driving signal according to the noise duration signal to reduce the interference on the sensing signal by the noise signal. The timing control circuit may also determine the timing and the slew rate of the touch driving signal according to the prohibit duration signal to reduce the interference on the data signal by the touch driving signal when the gate signal transitions. Therefore, through the driving method of the embodiment of the disclosure, the driver circuit can solve the issue of the sensing data or the display data being affected due to the interference by the parasitic capacitance.

Although the disclosure has been disclosed in the above embodiments, the embodiments are not intended to limit the disclosure. Persons skilled in the art may make some changes and modifications without departing from the spirit and scope of the disclosure. Therefore, the protection scope of the disclosure shall be defined by the appended claims.

What is claimed is:

1. A driver circuit, configured to drive a touch display panel, wherein the touch display panel comprises a sensor, the driver circuit comprising:
    a timing control circuit, configured to output a touch driving signal to the sensor, wherein the sensor generates a sensing signal according to the touch driving signal; and
    a touch sensing circuit, coupled to the timing control circuit and configured to receive the sensing signal,
    wherein the timing control circuit determines a timing of the touch driving signal according to a noise duration signal to drive the sensor to generate the sensing signal, wherein the touch driving signal drives the sensor to generate the sensing signal during an enable period, and the enable period of the touch driving signal is partially overlapped with a noise interference duration of the noise duration signal in time according to the noise duration signal.

2. The driver circuit according to claim 1, wherein the noise duration signal is configured to indicate that a reference voltage is interfered by a noise signal during the noise interference duration, and the reference voltage is configured to drive a reference voltage of a display pixel of the touch display panel.

3. The driver circuit according to claim 1, wherein the noise duration signal is outputted to the timing control circuit at a fixed frequency.

4. A driver circuit, configured to drive a touch display panel, wherein the touch display panel comprises a sensor, the driver circuit comprising:
    a timing control circuit, configured to output a touch driving signal to the sensor, wherein the sensor generates a sensing signal according to the touch driving signal; and
    a touch sensing circuit, coupled to the timing control circuit and configured to receive the sensing signal, wherein:

the touch sensing circuit receives a demodulation signal from the timing control circuit to perform a demodulation operation on the sensing signal to generate sensing data, the demodulation signal has a first demodulation period, and the touch sensing circuit performs the demodulation operation on the sensing signal during the first demodulation period, wherein the timing control circuit determines a timing of the touch driving signal according to a noise duration signal to drive the sensor to generate the sensing signal, wherein the first demodulation period of the demodulation signal is partially overlapped with the enable period of the touch driving signal in time according to the noise duration signal.

5. The driver circuit according to claim 4, wherein the first demodulation period of the demodulation period signal is partially overlapped with a noise interference duration of the noise duration signal in time according to the noise duration signal.

6. The driver circuit according to claim 4, wherein the first demodulation period of the demodulation signal is not overlapped with a noise interference duration of the noise duration signal in time according to the noise duration signal.

7. The driver circuit according to claim 4, wherein the demodulation signal also has a second demodulation period, and the touch sensing circuit stops performing the demodulation operation on the sensing signal during the second demodulation period.

8. The driver circuit according to claim 7, wherein the second demodulation period of the demodulation signal is partially overlapped with the enable period of the touch driving signal in time according to the noise duration signal.

9. The driver circuit according to claim 8, wherein the second demodulation period of the demodulation signal is partially overlapped with a noise interference duration of the noise duration signal in time according to the noise duration signal.

10. The driver circuit according to claim 8, wherein the second demodulation period of the demodulation signal is overlapped with a noise interference duration of the noise duration signal in time according to the noise duration signal.

11. The driver circuit according to claim 7, wherein signal levels of the demodulation signal during the first demodulation period and the second demodulation period are different.

12. The driver circuit according to claim 4, wherein the timing control circuit determines a duty cycle of the touch driving signal according to the noise duration signal.

13. The driver circuit according to claim 4, wherein the timing control circuit determines a duty cycle of the demodulation signal according to the noise duration signal.

14. A driver circuit, configured to drive a touch display panel, wherein the touch display panel comprises a sensor, the driver circuit comprising:

a timing control circuit, configured to output a touch driving signal to the sensor, wherein the sensor generates a sensing signal according to the touch driving signal;

a touch sensing circuit, coupled to the timing control circuit and configured to receive the sensing signal, wherein the timing control circuit determines a timing of the touch driving signal according to a noise duration signal to drive the sensor to generate the sensing signal, wherein the noise duration signal is configured to indicate that a reference voltage is interfered by a noise signal during a noise interference duration, and the reference voltage is configured to drive a reference voltage of a display pixel of the touch display panel; and a display driver circuit, coupled to the timing control circuit and configured to output the noise duration signal to the timing control circuit, wherein the touch sensing circuit receives a demodulation signal from the timing control circuit, and performs a demodulation operation on the sensing signal to generate sensing data, wherein when the noise signal is greater than a threshold, the display driver circuit outputs the noise duration signal to the timing control circuit.

15. The driver circuit according to claim 14, wherein the reference voltage has a voltage change during a vertical front porch period, and the display driver circuit outputs the noise duration signal to the timing control circuit during the vertical front porch period.

16. The driver circuit according to claim 15, wherein the timing control circuit determines whether to omit the sensing data according to the noise duration signal.

17. The driver circuit according to claim 14, wherein the driver circuit is implemented in a single semiconductor chip, and the single semiconductor chip comprises the timing control circuit, the touch sensing circuit, and the display driver circuit.

18. The driver circuit according to claim 14, wherein the driver circuit is implemented in at least two semiconductor chips, wherein among the at least two semiconductor chips, a first semiconductor chip comprises the timing control circuit and the touch sensing circuit, and a second semiconductor chip comprises the display driver circuit.

19. The driver circuit according to claim 14, wherein the touch sensing circuit comprises a filter circuit, and the filter circuit is configured to perform a filtering operation on the demodulated sensing signal to generate the sensing data.

20. The driver circuit according to claim 19, further comprising:

a digital circuit, coupled to the timing control circuit, the touch sensing circuit, and the display driver circuit, the digital circuit being configured to:

count a number of the noise interference durations of the noise duration signal of different touch sensing frames according to the noise duration signal, and adjust a filtering parameter of the filter circuit according to a count result.

21. The driver circuit according to claim 14, further comprising:

a digital circuit, coupled to the timing control circuit, the touch sensing circuit, and the display driver circuit, the digital circuit being configured to:

compute a time length of the single noise interference duration of the noise duration signal according to the noise duration signal, and output a computation result to the timing control circuit, wherein when the computation result is greater than a threshold, the timing control circuit omits the sensing data, and performs sensing again.

22. The driver circuit according to claim 14, further comprising:

a digital circuit, coupled to the timing control circuit, the touch sensing circuit, and the display driver circuit, the digital circuit being configured to:

compute a cumulative time length of a plurality of the noise interference durations of the noise duration signal according to the noise duration signal, and output a computation result to the timing control circuit, wherein when the computation result is greater than a threshold, the timing control circuit omits the sensing data, and performs sensing again.

23. The driver circuit according to claim 14, further comprising:

a digital circuit, coupled to the timing control circuit, the touch sensing circuit, and the display driver circuit, the digital circuit being configured to:

compute a difference value of a number of noise interference durations of the noise duration signal of different touch sensing frames according to the noise duration signal, and output a computation result to the timing control circuit, wherein when the computation result is greater than a threshold, the timing control circuit omits the sensing data, and performs sensing again.

24. The driver circuit according to claim 14, further comprising:

a digital circuit, coupled to the timing control circuit, the touch sensing circuit, and the display driver circuit, the digital circuit being configured to:

compute a cumulative time length of a plurality of noise interference durations of the noise duration signal according to the noise duration signal, and normalize the sensing data according to a computation result.

* * * * *